(12) United States Patent
Fischer (10) Patent No.: US 9,422,012 B2
(45) Date of Patent: Aug. 23, 2016

(54) MOTOR VEHICLE, IN PARTICULAR TAXI (71) Applicant: INNOVATIVE DRAGON LTD., London (GB)

(72) Inventor: Herwig Fischer, London (GB)

(73) Assignee: HEBEI D-DYNAMIC NEW ENERGY CAR STOCK CORPORATION LTD, Hebei Province (CN)

( * ) Notice: Subject to any disclaimer, the term of this patent is extended or adjusted under 35 U.S.C. 154(b) by 0 days.

(21) Appl. No.: 14/428,475

(22) PCT Filed: Sep. 9, 2013

(86) PCT No.: PCT/EP2013/068597
§ 371 (c)(1),
(2) Date: Mar. 16, 2015

(87) PCT Pub. No.: WO2014/044565
PCT Pub. Date: Mar. 27, 2014

(65) Prior Publication Data
US 2015/0232132 A1    Aug. 20, 2015

(30) Foreign Application Priority Data

Sep. 18, 2012 (DE) .................. 10 2012 018 500

(51) Int. Cl.
*B62D 25/20* (2006.01)
*B62D 31/00* (2006.01)
*B60N 2/01* (2006.01)
(Continued)

(52) U.S. Cl.
CPC ............ *B62D 31/00* (2013.01); *B60J 1/008* (2013.01); *B60J 5/0498* (2013.01); *B60K 1/04* (2013.01); *B60K 5/00* (2013.01); *B60N 2/01* (2013.01); *B62D 25/04* (2013.01); *E05B 77/02* (2013.01);

(58) Field of Classification Search
CPC .......... B60G 3/20; B60K 5/02; B60K 11/02; B60K 11/085; B60K 15/063; B60K 17/165; B60K 17/344; B60K 20/02; B60K 17/22; B60T 7/06; B60T 11/04; B60T 11/16; B62D 21/183
USPC ........ 180/90.6, 292, 311, 908; 296/204, 205
See application file for complete search history.

(56) References Cited

U.S. PATENT DOCUMENTS

| 2,190,218 | A | 2/1940 | Paton |
| 3,298,707 | A | 1/1967 | Jules Gerin |

(Continued)

FOREIGN PATENT DOCUMENTS

| DE | 12 81 282 B | 10/1968 |
| DE | 15 55 453 A1 | 1/1970 |

(Continued)

OTHER PUBLICATIONS

English translation of the International Preliminary Report on Patentability of Mar. 24, 2015.

*Primary Examiner* — Toan To
(74) *Attorney, Agent, or Firm* — McGlew and Tuttle, P.C.

(57) ABSTRACT

A motor vehicle for use in chauffeur operation, in particular a taxi or a limousine, has at least one driver's seat, at least one foot pedal and at least two front wheels. In order to design a vehicle to meet the specific requirements of short-distance chauffeur operation, the driver's seat is arranged between the front wheels in such a way that the foot pedal is positioned, viewed in the driving direction, between the axles, preferably in front of the front wheel axle.

18 Claims, 5 Drawing Sheets

(51) Int. Cl.
*B60J 1/00* (2006.01)
*B62D 25/04* (2006.01)
*B60K 1/04* (2006.01)
*B60J 5/04* (2006.01)
*E05B 77/02* (2014.01)
*B60K 5/00* (2006.01)

(56) References Cited

U.S. PATENT DOCUMENTS 5,327,989 A * 7/1994 Furuhashi ............... B60G 3/20
  180/248
6,131,848 A * 10/2000 Crow ...................... B64C 37/00
  244/2
D579,029 S * 10/2008 Harsh ........................ D15/33

FOREIGN PATENT DOCUMENTS

| DE | 10 2009 035078 A1 | 2/2010 |
| EP | 0 065 494 A1 | 11/1982 |
| EP | 0 088 015 A1 | 9/1983 |
| FR | 2 115 118 A1 | 7/1972 |
| GB | 2 471 364 A | 12/2010 |
| WO | 03/078192 A1 | 9/2003 |
| WO | 2008/110814 A2 | 9/2008 |

* cited by examiner

MOTOR VEHICLE, IN PARTICULAR TAXI

CROSS REFERENCE TO RELATED APPLICATIONS

This application is a United States National Phase Application of International Application PCT/EP2013/068597 filed Sep. 9, 2013 and claims the benefit of priority under 35 U.S.C. §119 of German Patent Application DE 10 2012 018 500.6 filed Sep. 18, 2012, the entire contents of which are incorporated herein by reference.

FIELD OF THE INVENTION

The present invention relates to a motor vehicle for use in chauffeur operation, in particular a taxi or a limousine, having at least one driver's seat, at least one foot pedal and at least two front wheels.

BACKGROUND OF THE INVENTION

Taxis travel primarily in city traffic and are put to completely different uses from normal passenger vehicles. The distances traveled are relatively short, the proportion of time for the process of the embarking and disembarking of passengers is considerably greater, the comfort of the passengers over long distances is considerably less important relative to the ease of boarding and a high final speed or longitudinal acceleration values or transverse acceleration values for sporty driving are completely irrelevant. A separate trunk makes loading difficult and the use of a normal passenger motor vehicle as a taxi is correspondingly inefficient.

SUMMARY OF THE INVENTION

It is, therefore, an object of the present invention to provide a vehicle which eliminates the aforementioned drawbacks and which is designed, in particular, for the requirements of short-distance chauffeur operation.

This object is achieved by the motor vehicle according to the invention in which the driver's seat is arranged between the front wheels such that, when viewed in the direction of travel, the foot pedal is positioned between the axles, preferably in front of the axle of the front wheels. As a result, a large space for the passengers is provided with a minimal external length so that the space available for the purposes of transporting passengers is utilized as far as possible.

According to a first embodiment of the invention, the driver's seat is not only pushed as far forward as possible but the driver's seat is arranged in the direction of travel along the longitudinal axis of the vehicle and is offset relative to the center between the front wheels, whereby additional space is provided for passengers.

In order to have a clear view when changing lanes and when moving into traffic from a parked position on the edge of the road, cameras are installed at the side, such cameras transmitting images without a blind spot onto screens and said images normally being visible in the external mirror. In order to permit the driver to drive in the customary manner, the screens are attached at the side in similar positions to where the external mirrors are normally located. The capacity for adjustment, depending on the driver's position and a blind spot or restricted field of view, are advantageously eliminated as a beam path to the driver is not required. In one particular variant, the cameras are placed further forward so that the blind spot, which is inevitable with the use of mirrors, is avoided. In this case, the lenses of the cameras are adjusted so that a familiar image as that found in lateral rear view mirrors is still produced from the screens.

According to a further preferred embodiment of the invention, the vehicle has a windshield which is curved such that the A-pillar is arranged behind or at the same height as the backrest of the driver's seat, when viewed in the direction of travel, whereby the passenger compartment gains further space compared to the conventional shape of a windshield. Moreover, by means of this embodiment the drag coefficient of the vehicle may be reduced, which is associated with a considerable saving of energy.

Moreover, the stagnation point of the vehicle front extends below the upper wheel running surface of the front wheels, preferably below the wheel axle and is preferably tapered, when viewed in the direction of the vehicle, wherein the vehicle front preferably does not have any flat vertical surfaces which are wider than a quarter of the vehicle width, when viewed in the direction of travel. Thus, the vehicle front preferably drops down sufficiently far in order to improve even further the view of the road at the front than is otherwise already ensured by the driver's position and, during an impact in the event of a collision with a pedestrian, in order to prevent the person struck from being pushed down and run over, the risk of a collision being considerably greater than with normal passenger motor vehicles due to the increased proportion of taxis in city traffic. Additionally, the vehicle front is preferably configured to taper to a point around the driver who is positioned toward the center, so that the impact on the windshield has fewer components aligned perpendicular to the surface, i.e. the pedestrian is deflected to the side.

According to a preferred embodiment, the windshield wiper shaft is located above the windshield so that a relatively simple drive is required and a collision of the shaft with pedestrians or riders of two-wheeled vehicles does not result in injuries due to the shaft. In one particular embodiment, the windshield wiper is divided into two parts and rotates about two shafts, wherein the second shaft is attached to the pivoting wiper arm so that a larger wiping surface which is more suited to the windshield contour is achieved. In order to be able to use the space between the front wheels for the driver, the drive is positioned entirely on the rear axle or is located right at the front below the vehicle floor or is offset to the side or in an ideal case mounted as an electric drive directly on the wheels, so that the space for the driver remains therebetween. In this case, the battery is preferably located below the floor of the passenger compartment and when discharged may either be replaced for a fully charged battery and/or charged up at taxi stands via a plug or by means of induction.

The passenger compartment also preferably has a flat floor and depending on the design is separated from the driver's cab via a partition. Due to the large floor area, the space in front of the seats may be used as luggage space and if required used with folding seats for further passengers.

The access is provided via one or more doors which may be actuated electrically. According to an advantageous embodiment of the invention, such a door is configured in two parts and so as to be pivotable with an upper door portion which is driven electrically, electrohydraulically or electro-pneumatically and the pivot axis thereof is aligned horizontally and parallel to the direction of travel. In this case, said axis is not located on the roof edge but is offset toward the center, whereby not only the lateral part of the vehicle body but also a part of the roof is pivoted so that when boarding a larger space remains at the side above the head of the person who is boarding. In this case, the second door portion is pivotably connected to the first door portion and folds down when the upper door portion is swung out, whereby the pivoting space is considerably restricted in the lateral direction. In one particular embodiment, the lower part may also be extended again after reaching the upper end position, so that an enlarged roof is formed for the passenger when disembarking as a protection against rain. In a further embodiment, a sensor and image recognition software together with external cameras ensure that the door does not open when the surrounding area is not clear and/or when vehicles on adjacent lanes of the road could collide therewith.

A display is preferably provided on the outside of the vehicle, said display displaying the current range, based on the respective charged state of the battery so that a passenger identifies from the outside which taxi in the queue or driving past is able to reach the desired destination. Alternatively, the distance which is achievable may also be displayed directly. In order not to load the battery with the heating and cooling of the vehicle interior and/or the battery, in one particular embodiment of the invention a heat accumulator consisting of materials of high thermal capacity, latent heat and/or zeolite materials is provided, said heat accumulator being charged directly at the battery charging stations, without putting stress on the battery life capacity. In a further variant, these materials are used when constructing and cladding the interior. Additionally and/or alternatively, cold accumulators are provided in the form of supercooled ice or dry ice.

Changing from low speeds of up to 70 km/h (within built-up areas) and above 70 km/h (outside built-up areas) occurs more rarely in taxis than in normal passenger motor vehicles.

According to a preferred embodiment of the invention, the electric drive comprises a first gear or even a direct transmission and a second gear with different speed ratios. As changing from one gear ratio to another takes place very rarely and the taxi is able to come to a standstill even in a high gear ratio, a very simple gearbox is provided which does not require a slipping clutch or synchronizations but permits a gear change by means of simple dog clutches due to the speed control and/or phase position control of the Emachine(s). In this manner, for the preselected driving mode, the optimum efficiency of the drive and the optimum driving dynamics for most driving profiles may be achieved without expensive gearbox solutions. The shift delays which occur are acceptable due to the lack of gear changes.

According to a preferred embodiment of the invention, when using an internal combustion engine drive, the drive is arranged to the side and in the direction of travel at the side adjacent to the driver's seat. Alternatively, the internal combustion engine drive may also be positioned behind the rear axle.

A practical exemplary embodiment of the invention is described hereinafter with reference to the drawings which show different views of a motor vehicle. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
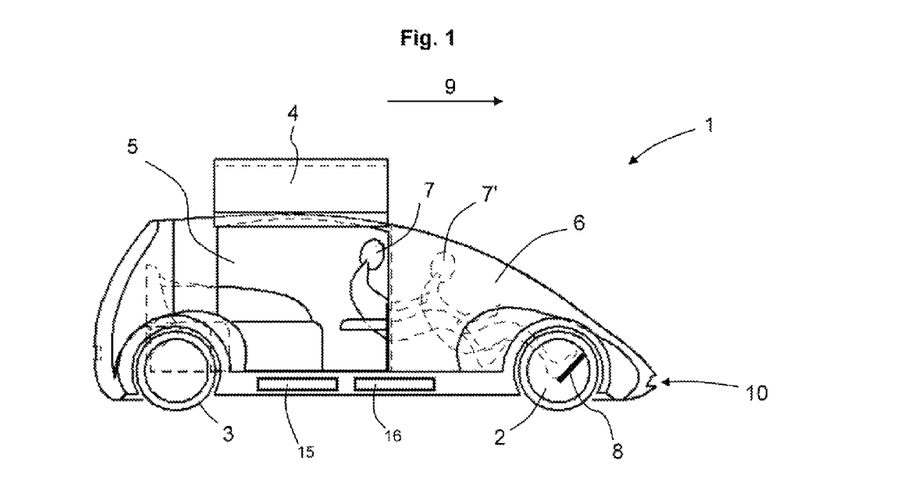
FIG. 1 is a side view of a vehicle.

FIG. 1 shows the motor vehicle 1 in a side view. The vehicle 1 has a pair of front wheels 2, 2' and a pair of rear wheels 3, 3', a door 4, a passenger compartment 5 as well as a driver's cab 6, where the driver sits in the positions 7, 7' shown when driving. In conventional vehicles, the driver adopts the position 7 which is considerably to the rear of the pair of front wheels 2, 2', as generally the motorized and bulky drive is arranged in front of the driver. According to a practical embodiment of the present invention, however, the driver adopts the position 7' so that, viewed in the direction of travel 9, the foot pedal 8 is arranged at the rear edge of the front tires 2, 2'. As a result, the passenger compartment 5 gains a considerable amount of space which may be used for transport purposes by passengers and/or luggage. A battery 15 is connected to the vehicle 1.

Moreover, the stagnation point 10 which is arranged below the wheel axles may be seen in FIG. 1. In the plan view (FIG. 2) it is also shown that the stagnation point 10 in the direction of travel 9 tapers to a point and has an angle α of 20° relative to a vertical line from the direction of travel 9.

Figure 3:
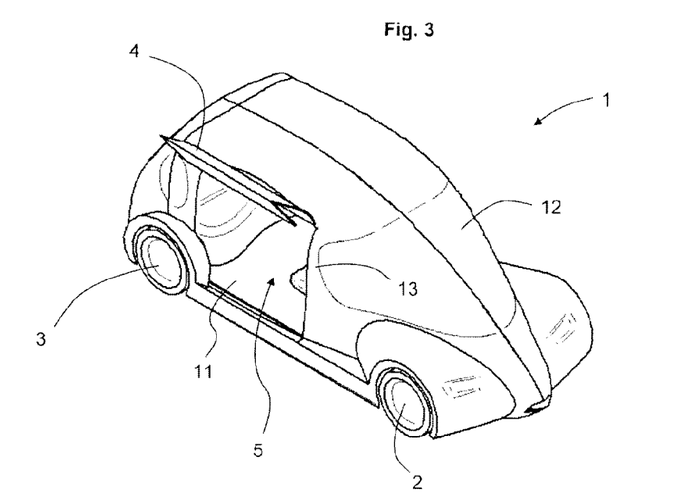
FIG. 3 is a side view of the vehicle of FIG. 1.

FIG. 3 shows the motor vehicle 1 in a perspective view, the tapered path of the stagnation point 10 also being able to be derived therefrom. The raised and flat floor 11 inside the driver's cab 5 may also be seen.

Figure 2:
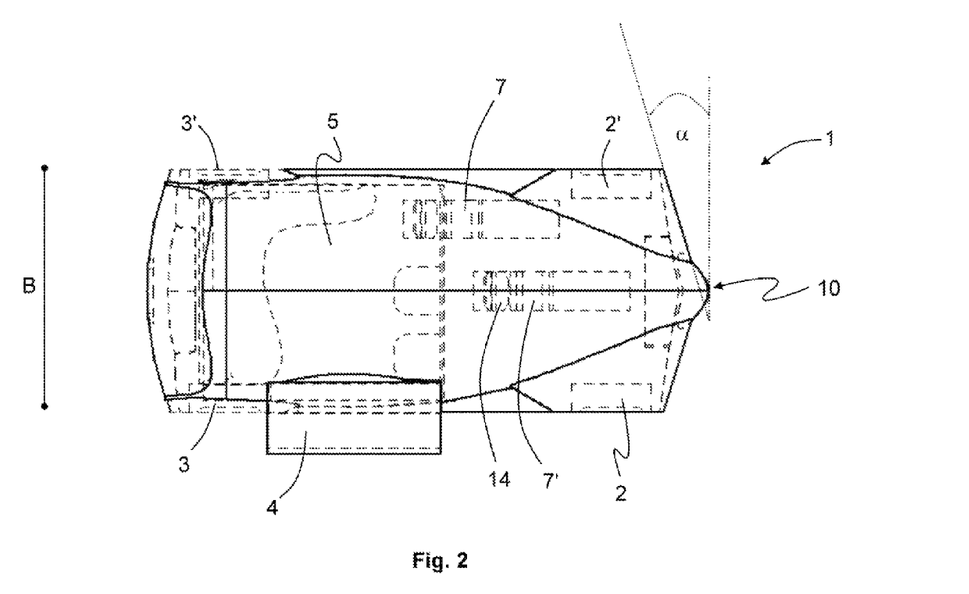
FIG. 2 is a top view of the vehicle of FIG. 1.

In comparison with the windshield of conventional motor vehicles, the windshield 12 of the motor vehicle 1 is very steeply curved so that in the direction of travel 9 the A-pillar 13 is arranged behind the backrest (not shown) of the driver's seat 14 (FIG. 2).

Figure 4A:
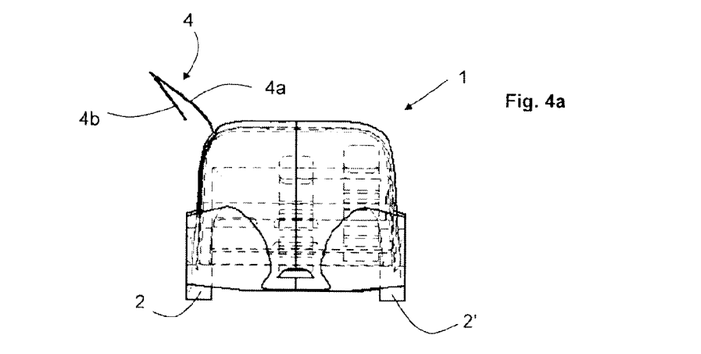
FIG. 4a is a front view of the vehicle of FIG. 1 showing the door in an open position with the lower door portion folded downward.
Figure 4B:
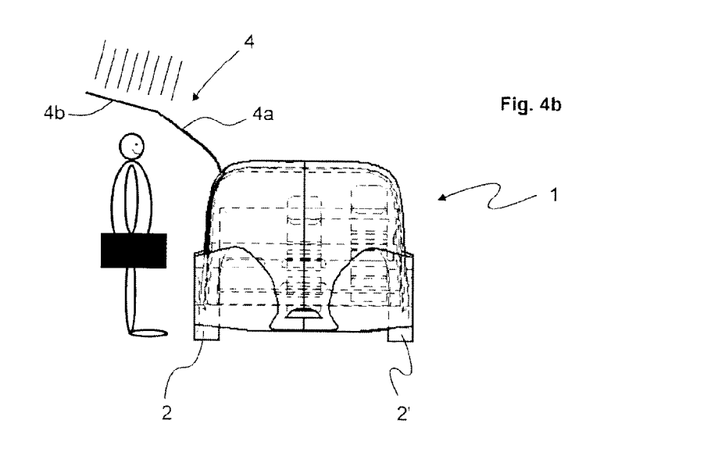
FIG. 4b is a front view of the vehicle of FIG. 1 showing the door in an open position with the lower door portion folded upward.

The door 4 is shown in all of the figures. The door 4 is configured according to a practical embodiment of the invention in two parts and so as to be pivotable with the upper door portion 4a and the lower door portion 4b. The pivot axis of the upper door portion 4a extends along the roof upper edge and parallel to the direction of travel 9. The door 4 and thus the upper door portion 4a may be pivoted away upwardly, wherein to avoid an unnecessary requirement for space the lower door portion 4b folds downward. When the door 4 is open, the lower door portion 4b may also fold upward (see FIGS. 4a, 4b) whereby easy boarding and even rain protection is provided for passengers boarding and disembarking, as shown in FIG. 4b.

Figure 5A:
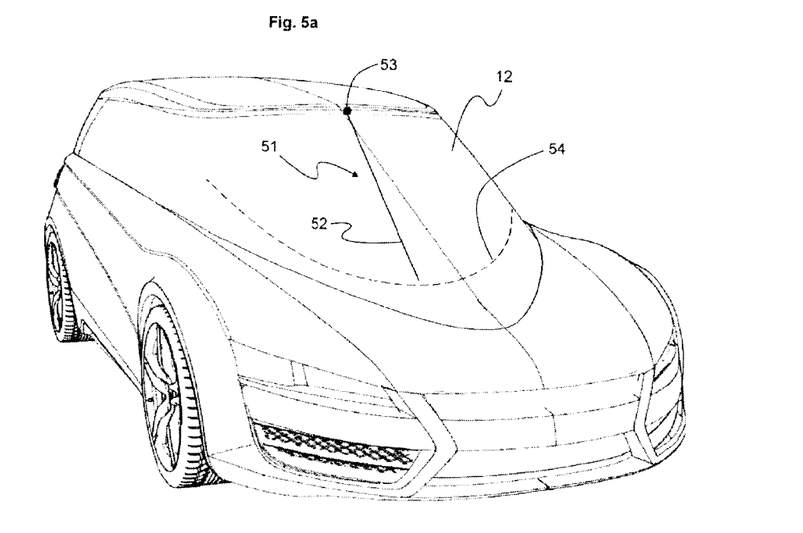
FIG. 5a is a front perspective view of the vehicle of FIG. 1 showing one of different embodiments of the windshield wipers.
Figure 5B:
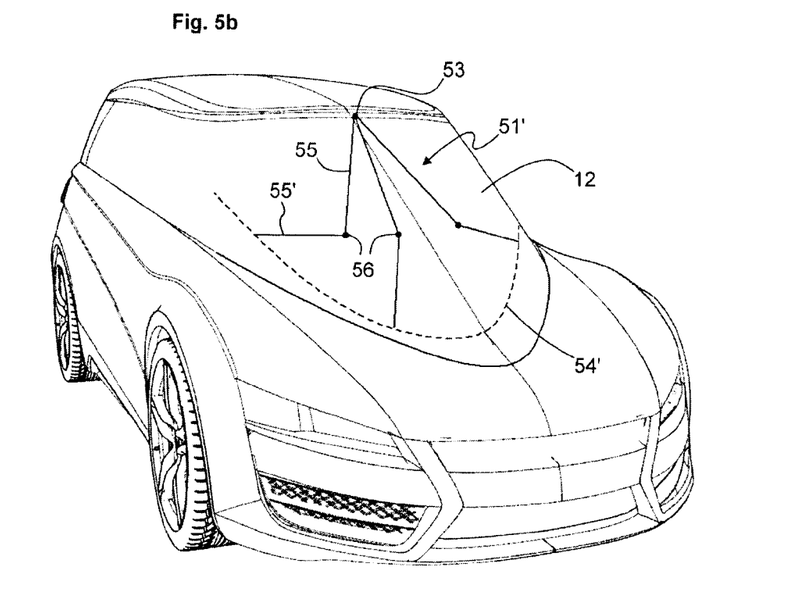
FIG. 5b is a front perspective view of the vehicle of FIG. 1 showing another of different embodiments of the windshield wipers.

In FIGS. 5a and b different embodiments of the windshield wipers 51, 51' are shown. According to the embodiment illustrated in FIG. 5a, a single wiper arm 52 which is pivotably mounted about the pivot axis 53 is provided and during the wiping procedure said wiper arm passes within the boundary line 54 of the wiping surface shown in dashed lines. In the embodiment according to FIG. 5b, the wiper arm 51' is configured in two parts and has a first and a second wiper arm 55, 55' which are pivotably connected together about the rotational axis 56. The first wiper arm 55 is in turn pivotably 5 mounted about the rotational axis 53, which is arranged at the upper end of the windshield 12. (FIG. 5b shows the wiper arm 51' in three different positions.) By the articulated design of the wiper arm 51 the boundary line 54' of the wiping surface may be optimally adapted to the contour of the windshield.

Figure 6A:
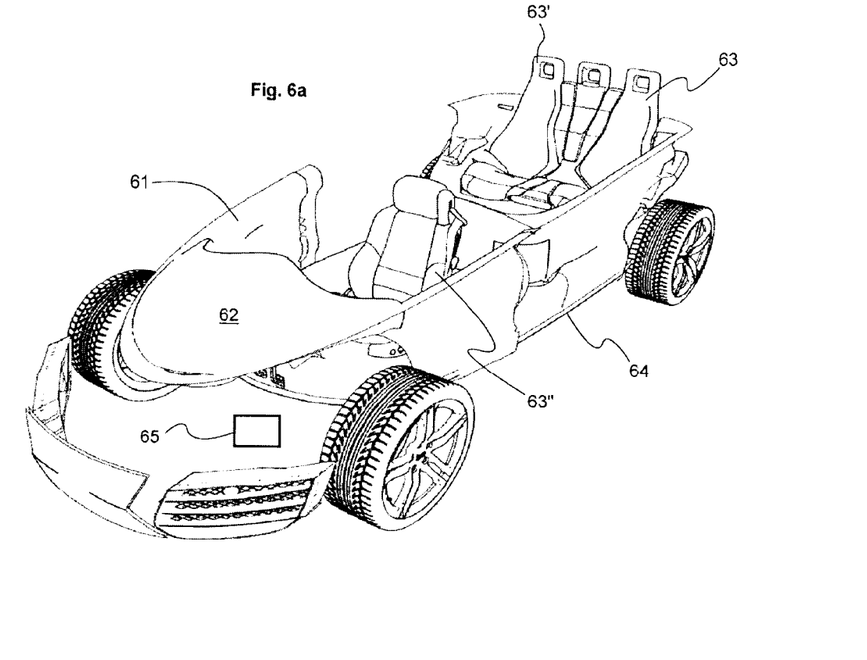
FIG. 6a is a front perspective partial sectional view of the vehicle of FIG. 1.

The partial sectional view of FIG. 6a shows different features of a practical embodiment of the vehicle. In particular, the internal cladding 61, the instrument panel 62 and the seats 63, 63', 63" accordingly consist of a material having a high thermal capacity.

Moreover, an accumulator 16 is arranged in the floor 64 of the vehicle. The accumulator 16 maybe a zeolite accumulator or a latent heat accumulator.

Finally, an empty space 65 is provided in the vehicle, an insulated and replaceable ice block being able to be arranged in said empty space in order to permit thereby an energy-saving air conditioning system.

Figure 6B:
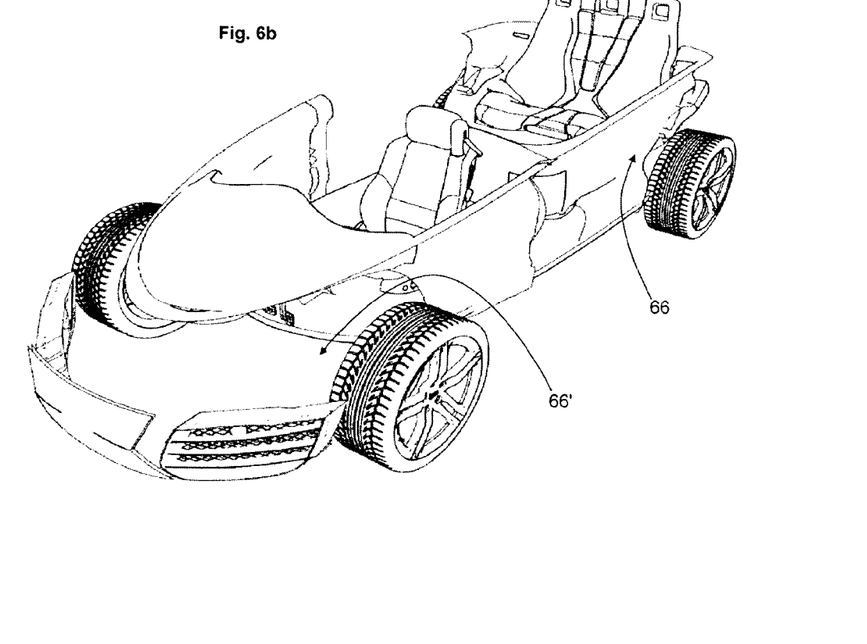
FIG. 6b is another front perspective partial sectional view of the vehicle of FIG. 1 showing drive positions.

FIG. 6b shows the position 66, 66' of the drive.

Figure 6C:
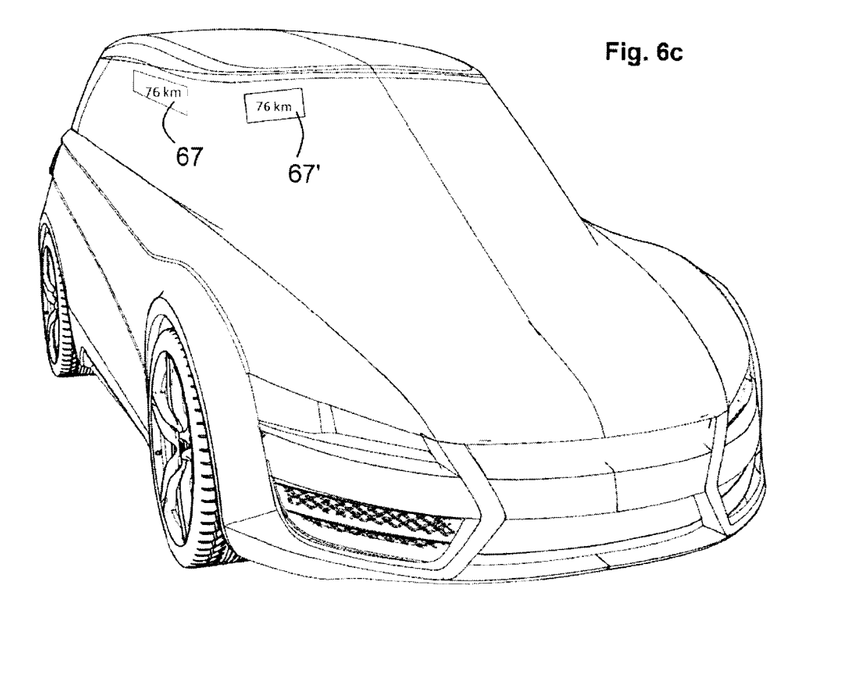
FIG. 6c is a perspective view of the vehicle of FIG. 1 showing two positions of the displays.

Finally, in FIG. 6c two positions of the displays 67, 67' are shown by way of example, where the distance yet to be covered by the vehicle (for example 76 km) is provided.

While specific embodiments of the invention have been shown and described in detail to illustrate the application of the principles of the invention, it will be understood that the invention may be embodied otherwise without departing from such principles.

The invention claimed is:

1. A motor vehicle for use in chauffeur operation including use as a taxi or a limousine, the motor vehicle comprising:
   a driver's seat;
   at least one foot pedal;
   at least two front wheels with axles, wherein the driver's seat is arranged between the at least two front wheels such that, when viewed in a direction of travel, the foot pedal is positioned between the axles, in front of the axles of the at least two front wheels; and
   a pivotable door configured in two parts, with an upper door portion which is driven electrically, electrohydraulically or electro-pneumatically and the pivot axis thereof is aligned horizontally and parallel to the direction of travel and a second door portion which is pivotably connected to the first door portion and folds down when the upper door portion is swung out.

2. The vehicle as claimed in claim 1, wherein the driver's seat is arranged in the direction of travel along a longitudinal axis of the vehicle and is offset relative to the center between the at least two front wheels such that an outside foot of a driver is positioned inside the vehicle past a wheel housing.

3. The vehicle as claimed in claim 1, further comprising a windshield which is curved such that an A-pillar is arranged behind or at a same longitudinal position as a backrest of the driver's seat, when viewed in the direction of travel.

4. The vehicle as claimed in claim 1, wherein a stagnation point of the vehicle front is arranged below the upper wheel running surface of the at least two front wheels, below the wheel axle and tapers to a point, when viewed in the direction of travel, wherein the vehicle front does not have any flat vertical surfaces which are wider than a quarter of the vehicle width, when viewed in the direction of travel.

5. The vehicle as claimed in claim 1, further comprising a windshield and at least one pivotable windshield wiper, the rotational axis thereof being arranged above the windshield.

6. The vehicle as claimed in claim 1, further comprising a raised floor inside a passenger compartment below which a battery or a rechargeable battery is arranged.

7. The vehicle as claimed in claim 1, wherein the lower door portion is able to be pivoted out after reaching an upper dead center point.

8. The vehicle as claimed in claim 1, wherein the movement of the door is locked by means of a sensor and/or image recognition software and corresponding cameras, upon a determination of a risk of a collision.

9. The vehicle as claimed in claim 1, further comprising a battery wherein the charged state of the battery is displayed on the outside of the vehicle or the range of the vehicle is displayed on the outside of the vehicle or the charged state and the range of the vehicle are displayed on the outside of the vehicle.

10. The vehicle as claimed in claim 1, further comprising heat accumulators comprising elements comprised of heat accumulating materials arranged in the vehicle and/or parts of the vehicle made from the heat accumulating materials wherein the accumulators are not charged or not exclusively charged by the battery.

11. The vehicle as claimed in claim 10, wherein the heat accumulator is configured as a latent heat accumulator.

12. The vehicle as claimed in claim 1, further comprising an internal combustion engine drive offset to a side and arranged in the direction of travel at a side adjacent to the driver's seat.

13. The vehicle as claimed in claim 12, wherein the internal combustion engine drive is arranged behind the rear axle.

14. The vehicle as claimed in claim 1, further comprising cold accumulators are provided in the form of supercooled ice or dry ice.

15. A motor vehicle for use in chauffeur operation including use as a taxi or a limousine, the motor vehicle comprising:
   a driver's seat;
   at least one foot pedal; and
   at least two front wheels with axles, wherein the driver's seat is arranged between the at least two front wheels such that, when viewed in a direction of travel, the foot pedal is positioned between the axles, in front of the axles of the at least two front wheels, wherein the driver's seat is arranged in the direction of travel along a longitudinal axis of the vehicle and is offset relative to the center between the at least two front wheels such that an outside foot of a driver is positioned inside the vehicle past a wheel housing.

16. A motor vehicle for use in chauffeur operation including use as a taxi or a limousine, the motor vehicle comprising:
   a driver's seat;
   at least one foot pedal;
   at least two front wheels with axles, wherein the driver's seat is arranged between the at least two front wheels such that, when viewed in a direction of travel, the foot pedal is positioned between the axles, in front of the axles of the at least two front wheels; and a windshield which is curved such that an A-pillar is arranged behind or at a same longitudinal position as a backrest of the driver's seat, when viewed in the direction of travel.

17. A motor vehicle for use in chauffeur operation including use as a taxi or a limousine, the motor vehicle comprising:
a driver's seat;
at least one foot pedal; and
at least two front wheels with axles, wherein the driver's seat is arranged between the at least two front wheels such that, when viewed in a direction of travel, the foot pedal is positioned between the axles, in front of the axles of the at least two front wheels, wherein a stagnation point of the vehicle front is arranged below the upper wheel running surface of the at least two front wheels, below the wheel axle and tapers to a point, when viewed in the direction of travel, wherein the vehicle front does not have any flat vertical surfaces which are wider than a quarter of the vehicle width, when viewed in the direction of travel.

18. A motor vehicle for use in chauffeur operation including use as a taxi or a limousine, the motor vehicle comprising:
a driver's seat;
at least one foot pedal;
at least two front wheels with axles, wherein the driver's seat is arranged between the at least two front wheels such that, when viewed in a direction of travel, the foot pedal is positioned between the axles, in front of the axles of the at least two front wheels; and
a windshield and at least one pivotable windshield wiper, the rotational axis thereof being arranged above the windshield.

* * * * *